US012644563B2

(12) United States Patent
Rosner

(10) Patent No.: US 12,644,563 B2
(45) Date of Patent: Jun. 2, 2026

(54) CEILING MOUNT FOR MEDICAL DEVICES

(71) Applicant: Amtrion GmbH, Porta Westfalica (DE)

(72) Inventor: Matthias Rosner, Bad Oeynhausen (DE)

(73) Assignee: Amtrion GmbH, Portawestfalica (DE)

( * ) Notice: Subject to any disclaimer, the term of this patent is extended or adjusted under 35 U.S.C. 154(b) by 0 days.

(21) Appl. No.: 18/659,911

(22) Filed: May 9, 2024

(65) Prior Publication Data

US 2024/0377024 A1 Nov. 14, 2024

(30) Foreign Application Priority Data

May 9, 2023 (DE) ...................... 20 2023 102 516.1

(51) Int. Cl.
F16M 13/02 (2006.01)
(52) U.S. Cl.
CPC ................................. F16M 13/027 (2013.01)
(58) Field of Classification Search
CPC ...................................................... F16M 13/027
USPC .......................... 248/317, 342, 343, 344, 345
See application file for complete search history.

(56) References Cited

U.S. PATENT DOCUMENTS

| | | | | | |
|---|---|---|---|---|---|
| 983,701 | A | * | 2/1911 | Gardiner | ................. F21V 21/02 411/222 |
| 1,380,147 | A | * | 5/1921 | Hoar | ........................ F21V 21/02 248/345 |
| 2,215,331 | A | * | 9/1940 | Marsh | ...................... F16B 9/054 29/897.3 |
| 2,661,924 | A | * | 12/1953 | Melvin | ................... F21V 21/02 362/457 |
| 6,866,410 | B2 | * | 3/2005 | Jesurun | ................... F21V 21/03 362/225 |
| 8,876,075 | B2 | * | 11/2014 | Diez | .................... A61G 12/004 248/323 |
| 2023/0025995 | A1 | | 1/2023 | Botkin et al. | |

FOREIGN PATENT DOCUMENTS

| | | |
|---|---|---|
| CN | 201090918 Y | 7/2008 |
| CN | 205514943 U | 8/2016 |
| CN | 208611201 U | 3/2019 |
| EP | 1571045 A1 | 9/2005 |

* cited by examiner

*Primary Examiner* — Anita M King
(74) *Attorney, Agent, or Firm* — Muncy, Geissler, Olds & Lowe, P.C.

(57) ABSTRACT

A ceiling mount for medical devices comprising a support that can be secured to a ceiling. A ceiling tube is longitudinally extended vertically in a mounting position and held on the support. A cover mounted in a fixed position relative to the support and to the ceiling tube for the support is provided. The cover has a pass-through opening for the ceiling tube (2), which is dimensioned slightly larger than an outer dimension of the ceiling tube, and can be placed against the ceiling with a free edge section. An elastomer ring surrounds the ceiling tube and is placed against the cover. The elastomer ring is dimensioned so that it lies against the ceiling tube on the lateral surface and is tensioned. The elastomer ring can be positioned on the ceiling tube so that it presses the cover against the ceiling in the mounting position.

14 Claims, 4 Drawing Sheets

CEILING MOUNT FOR MEDICAL DEVICES

This nonprovisional application claims priority under 35 U.S.C. § 119 (a) to German Patent Application No. 20 2023 102 516.1, which was filed in Germany on May 9, 2023, and which is herein incorporated by reference.

BACKGROUND OF THE INVENTION

Field of the Invention

The invention relates to a ceiling mount for medical devices comprising a support which can be secured to a ceiling, a ceiling tube which is longitudinally extended vertically in a mounting position and held on the support, and a cover, mounted in a fixed position relative to the support and to the ceiling tube, for the support, wherein the cover has a pass-through opening for the ceiling tube, which is dimensioned slightly larger than an outer dimension of the ceiling tube, and can be placed against the ceiling with a free edge section. The invention relates further to an installation arrangement with a ceiling-mounted ceiling mount and to the use of the ceiling mount for the ceiling-suspended mounting of medical devices.

Description of the Background Art

These days, generic ceiling mounts usually provide for the cover for the support to be fixed to the support itself or to the ceiling tube by means of a mounting screw. The mounting screw for the cover is typically screwed through the cover and is visible from the outside. The mounting screw can be perceived as obtrusive. Moreover, a suitable tool is always required when mounting and removing the cover.

SUMMARY OF THE INVENTION

It is therefore an object of the present invention to provide an easy-to-install and visually appealing ceiling mount and an installation arrangement therewith.

To achieve the object, is characterized in that an elastomer ring surrounding the ceiling tube and placed against the cover is provided, wherein the elastomer ring is dimensioned so that it lies against the ceiling tube on the lateral surface and is tensioned, and in that the elastomer ring can be positioned on the ceiling tube so that it presses the cover against the ceiling in the mounting position.

An advantage of the invention is that the mounting of the cover can occur intuitively and without tools. In this regard, the elastomer ring can be moved manually along the ceiling tube and positioned so that the cover surrounds the support and is placed with the free edge section against the ceiling. In this respect, the elastomer ring secures the position of the cover relative to the other components of the ceiling mount.

The removal of the cover can occur in a similar way without tools. The elastomer ring may be moved along the ceiling tube for this purpose. Next, the cover can then be removed. Because the elastomer ring can be positioned anywhere on the ceiling tube and secures the cover in this arbitrary position against further sliding down, the maintenance access to the support or ceiling tube sections near the ceiling is also simplified by the provision of the elastomer ring to secure the cover. In particular, there is no need to completely dismantle the cover, which today is typically only possible after a complex disassembly of a support arm system which is held at the end on the ceiling tube and which in turn supports the medical device.

By dispensing with the screw connection, moreover, the ceiling mount achieves a particularly attractive appearance and difficult-to-clean connection points are avoided. In addition, there is no need to break through the cover for the mounting screw. In this respect, the mechanical strength of the cover improves and penetration of dirt and moisture into the interior of the cover is prevented.

The pass-through opening of the cover can have a collar, projecting in the direction of the support and/or the ceiling tube, at least in sections, and preferably completely circumferential. The collar in conjunction with an outer lateral surface of the ceiling tube forms a receiving groove, tapering in the direction of the support, for the elastomer ring. The collar formed in this way advantageously defines a contact surface for the elastomer ring.

The contact surface can form a frustoconical inclined surface which is oriented at an acute angle to the ceiling tube. The angled contact surface promotes a secure hold and an increased clamping effect during the fixing of the cover. In addition, the angled orientation of the collar promotes a centering of the cover in relation to the ceiling tube during mounting.

The receiving groove can be dimensioned so that it receives the elastomer ring preferably completely or at least to a predominant extent. The insertion of the elastomer ring into the receiving groove advantageously facilitates a secure mounting of the cover. In addition, an attractive appearance of the ceiling mount results if the elastomer ring disappears completely or in sections into the receiving groove and is not or hardly perceptible from the outside.

The elastomer ring can have a constant and preferably round cross section. In particular, a commercial O-ring, which is often used as a sealing ring, can form the elastomer ring of the invention. Advantageously, such design forms of the elastomer ring can be realized cost-effectively. Moreover, the round cross-sectional geometry simplifies the mounting of the elastomer ring, because it can be moved or rolled along the lateral surface of the ceiling tube comparatively easily due to the small contact surface with the ceiling tube and the round cross-sectional geometry.

The cover can be formed thin-walled and shell-like. The thin-walled, shell-like construction advantageously imparts membrane properties on the cover. It is possible hereby to deform the cover during mounting and to press it against the ceiling with a certain pretension. If the elastomer ring is then in position and the cover is released, the cover deforms back and presses against the elastomer ring. It is then securely held and fixed by the elastomer ring.

The cover can be formed rotationally symmetric. Advantageously, the mounting of the cover is simplified by the rotational symmetry, because it can be provided in any position. In addition, the rotational symmetry promotes the mechanical strength.

Also provided is an installation arrangement that comprises the ceiling-mounted ceiling mount with the support fastened to the ceiling, the ceiling tube extending vertically in the mounting position and fixed to the support, and the cover, mounted in a fixed position to the support and to the ceiling tube, for the support. The cover has a pass-through opening for the ceiling tube. The pass-through opening is dimensioned slightly larger than an outer dimension of the ceiling tube. Moreover, the cover is placed against the ceiling with a free edge section of the same. Furthermore, the elastomer ring surrounding the ceiling tube and placed against the cover is also provided. The elastomer ring is dimensioned so that it lies against the ceiling tube on the lateral surface and is pretensioned. In this regard, the elastomer ring is positioned on the vertically longitudinally extended ceiling tube so that it presses the cover against the ceiling.

The ceiling mount can be used, for example, for ceilings and the mounting of medical equipment, for example, in operating theaters, emergency rooms, or other treatment rooms. In this case, the medical devices are typically attached to a support arm system, which in turn is fixed pivotably and/or adjustable in height to the end of the ceiling tube of the ceiling mount. Moreover, the ceiling mount can be provided in industry and trade. For example, a diagnostic terminal in a vehicle workshop or a control unit of a production line can be suspended using the ceiling mount of the invention.

The features mentioned herein can be essential to the invention in any case individually or also in any combination. Features and details, described according to the invention, of the ceiling mount naturally also apply in connection with the installation arrangement and vice versa. Thus, mutual reference can always be made to the disclosure of the individual aspects of the invention. The drawings are used merely by way of example for the clarification of the invention and are not restrictive in nature.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
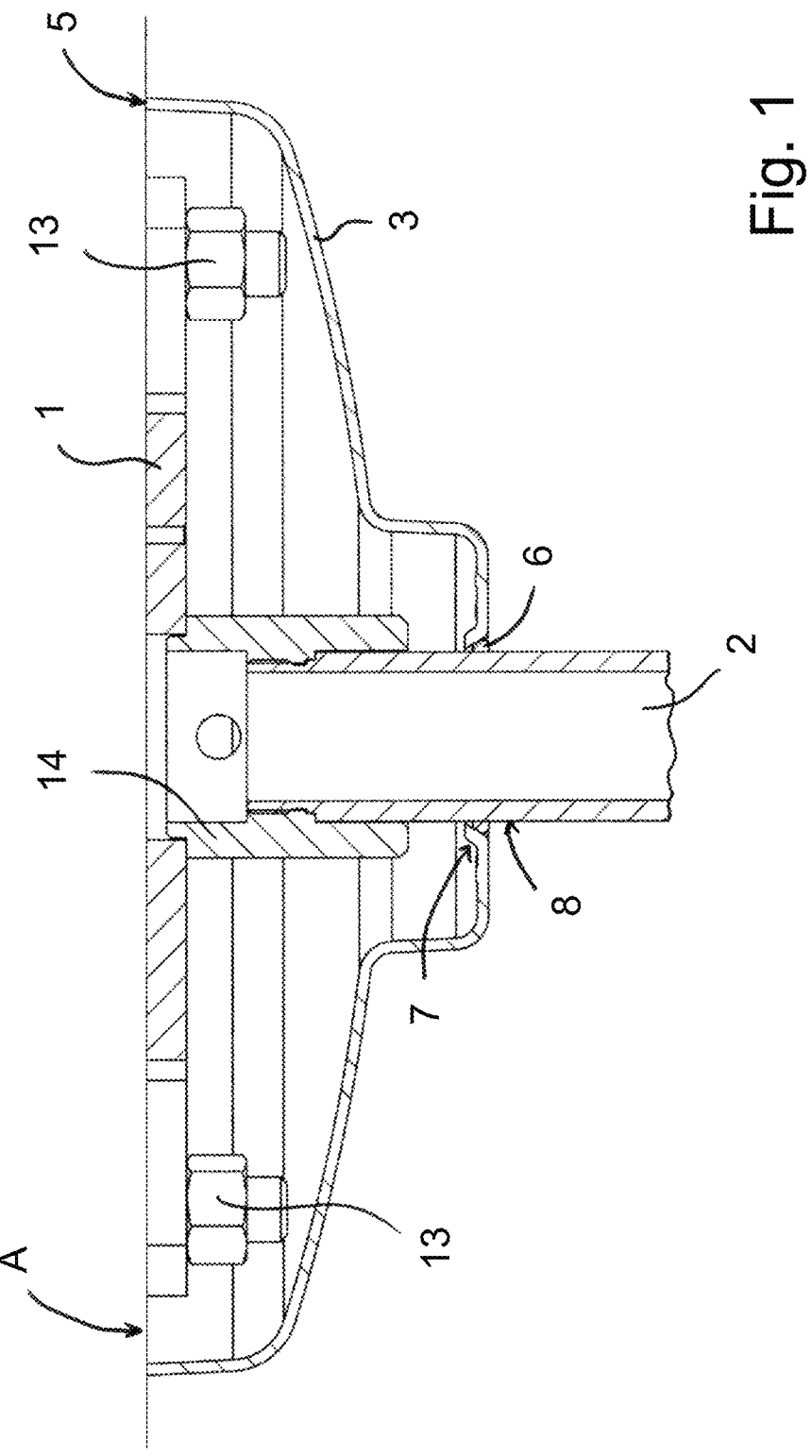
FIG. 1 is a sectional view of an installation arrangement with a ceiling mount of the invention.
Figure 2:
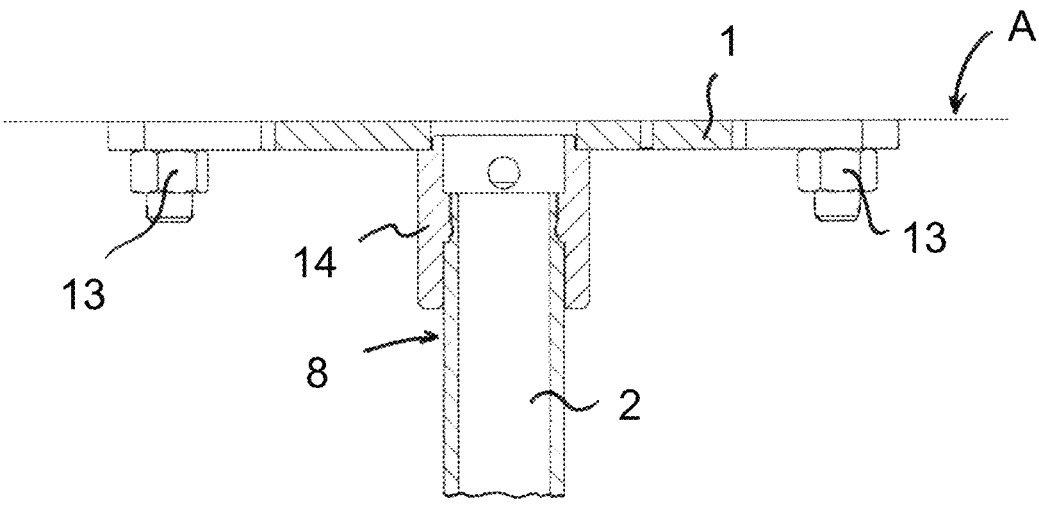
FIG. 2 shows a first mounting step of the ceiling mount according to FIG. 1.
Figure 3:
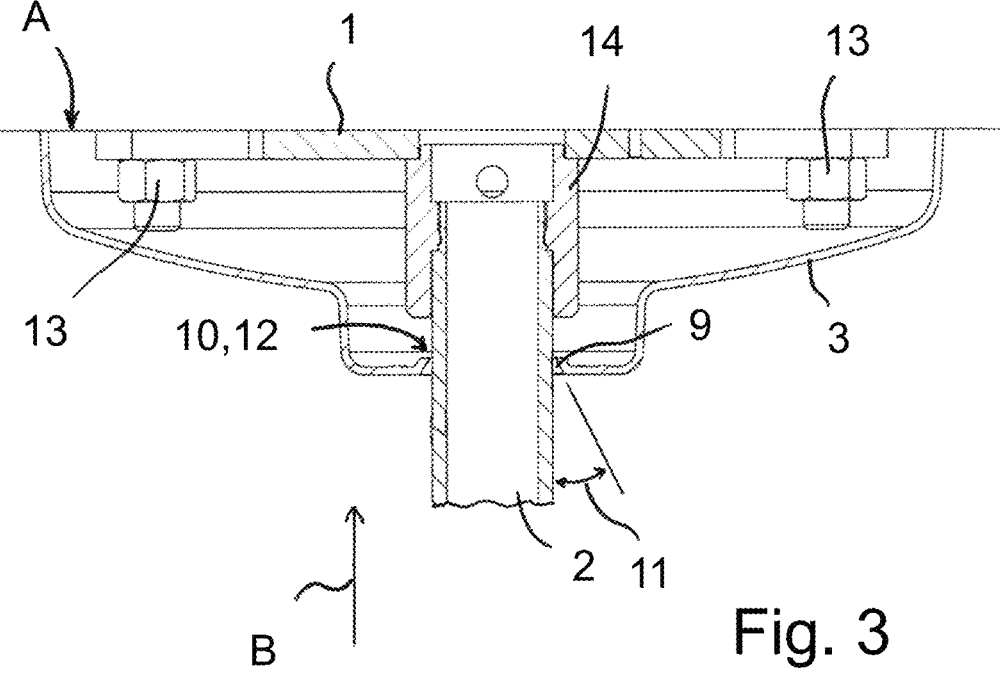
FIG. 3 shows a second mounting step of the ceiling mount according to FIG. 1.
Figure 4:
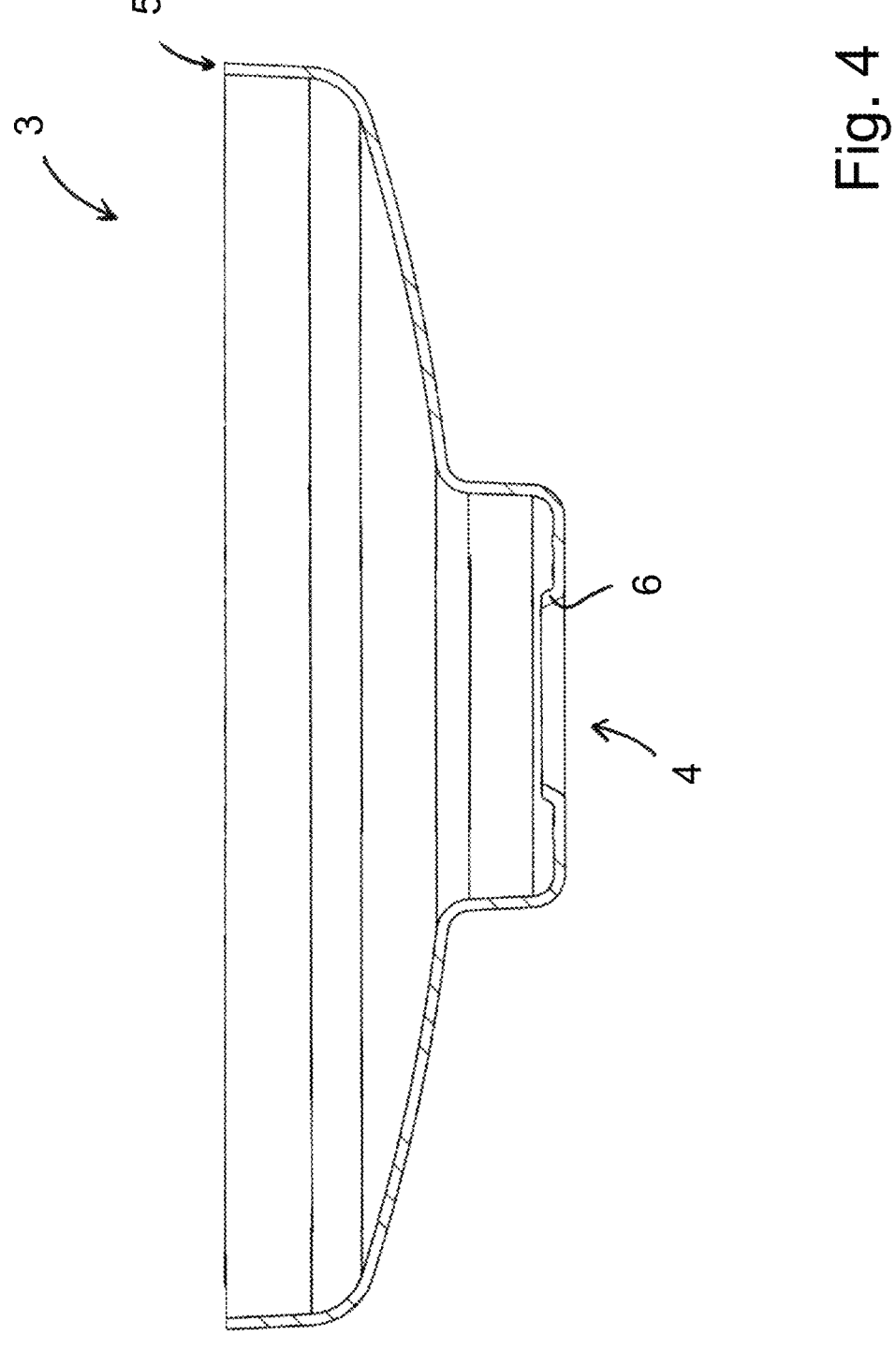
FIG. 4 is a sectional view of a cover of the ceiling mount according to FIG. 1.
Figure 5:
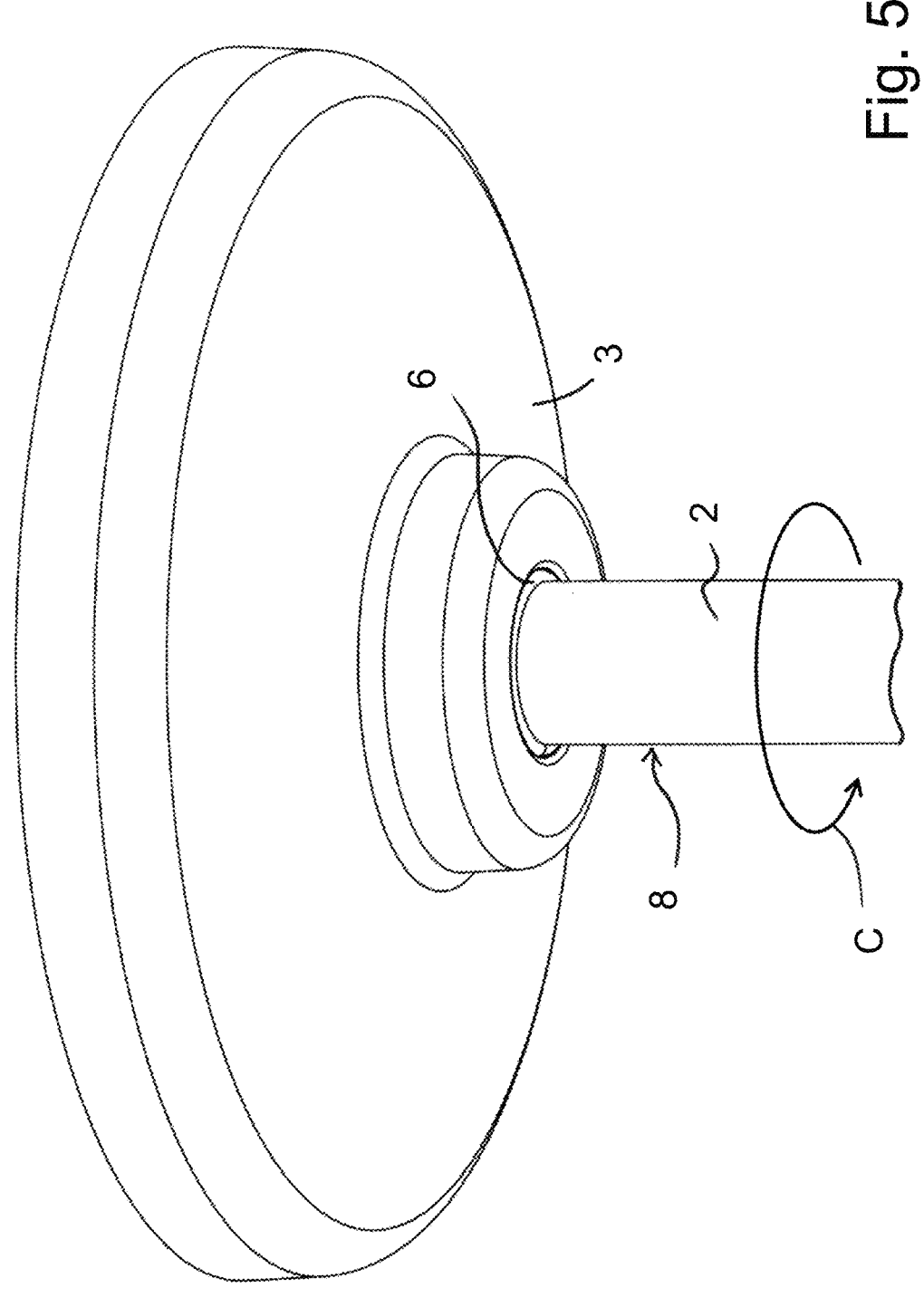
FIG. 5 shows a perspective rendering of the ceiling mount according to FIG. 1.

A ceiling mount of the invention and an installation arrangement with this mounting device are used for the ceiling-mounted attachment of medical devices, for example, in an operating theater, an emergency room, or another medical treatment room.

The ceiling mount comprises a support 1 mounted on a ceiling A, a ceiling tube 2 held in a mounting position on the support and vertically extended longitudinally, and a cover which is mounted in a fixed position relative to support 1 and to ceiling tube 2 and preferably completely surrounds and covers support 1 and ceiling tube 2 in sections. Cover 3 has a pass-through opening 4 for ceiling tube 2. Pass-through opening 4 is slightly larger than an outer dimension of ceiling tube 2. On a side facing away from pass-through opening 4, cover 3 has a free edge section 5. Cover 3 is placed in the mounting position against ceiling A with free edge section 5.

The ceiling mount furthermore provides an elastomer ring 6, which surrounds ceiling tube 2 and is placed against cover 3. Elastomer ring 6 is dimensioned so that it rests against ceiling tube 2 on the lateral side and is pretensioned in a circumferential direction C of ceiling tube 2. In relation to a vertical mounting position on ceiling tube 2, elastomer ring 6 is positioned so that it presses cover 3 against ceiling A.

The mounting of ceiling mount takes place so that support 1 is first fixed to ceiling A by means of a screw connection 13. Ceiling tube 2 is then mounted using a tube receptacle 14 fixed to support 1 so that it extends vertically and projects perpendicularly from ceiling A. Cover 3 and then elastomer ring 6 are subsequently pushed onto ceiling tube 2 from below in a mounting direction B via a free end of ceiling tube 2.

To bring about a secure fixing of cover 3 to ceiling A, a collar 7, projecting inwards in the direction of support 1 and ceiling tube 2 in relation to the mounting position, surrounds pass-through opening 4 of the cover. In the present case, collar 7 forms an inclined surface, which is formed frusto-conical and assumes an acute angle 11 to an outer lateral surface 8 of ceiling tube 2. In conjunction with outer lateral surface 8 of ceiling tube 2, collar 7 forms a receiving groove 9 in which elastomer ring 6 engages in the mounting position of cover 3.

Receiving groove 9 for elastomer ring 6 may be dimensioned so that elastomer ring 6 is almost completely inserted into receiving groove 9 in the mounting position. It is therefore barely visible or perceptible to an outside observer. At the same time, the elastomer ring seals an annular gap 10, which is formed in an encircling manner in the circumferential direction C at a base 12 of receiving grooves 9 between ceiling tube 2 and collar 7 of cover 3. When functionally necessary, annular gap 10 is smaller than a cross-sectional width, determined horizontally in the mounting position, of elastomer ring 6. Preferably, an average width of annular gap 10 is less than 5 mm. An average width of 2 mm or less is particularly preferred.

For example, an O-ring, which is often used as a sealing ring, can be used as an elastomer ring. Elastomer rings 6 of this type are cost-effective to manufacture and durable.

Cover 3 can be formed thin-walled and shell-like. The thin-walled, shell-like design of cover 3 gives it elasticity and a membrane-like function. For example, cover 2 can be made of a plastic or metallic material.

The elastically deformable cover 3 can be slightly deformed when it is pressed against ceiling A. If elastomer ring 6 is now moved along ceiling tube 2 in the direction of cover 3 and inserted into receiving groove 9, cover 3 is pressed against ceiling A with a certain pretension and securely mounted. The inclined surface, which is formed by collar 7 of cover 3, ensures a secure hold of cover 3 and at the same time an at least rough centering of cover 3 relative to ceiling tube 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A ceiling mount for a medical device, the ceiling mount comprising:

a support adapted to be secured to a ceiling;

a ceiling tube that is longitudinally extended vertically in a mounting position and held on the support;

a cover mounted in a fixed position relative to the support and to the ceiling tube for the support, the cover having a pass-through opening for the ceiling tube, which is dimensioned slightly larger than an outer dimension of the ceiling tube and is adapted to be placed against the ceiling with a free edge section; and an elastomer ring surrounding the ceiling tube and placed against the cover, wherein the elastomer ring is dimensioned so that it lies against the ceiling tube on an outer lateral surface and is tensioned, and the elastomer ring being positioned on the ceiling tube so that it presses the cover against the ceiling in the mounting position.

2. The ceiling mount according to claim 1, wherein the pass-through opening of the cover has a collar that is oriented in a direction of the support and is circumferential at least in sections, wherein a receiving groove tapers in the direction of the support and in which the elastomer ring engages is formed by the collar in conjunction with the outer lateral surface of the ceiling tube.

3. The ceiling mount according to claim 2, wherein the collar forms a conical inclined surface, at least in sections, against which the elastomer ring is placed in the mounting position and which is oriented at an acute angle to the outer lateral surface of the ceiling tube.

4. The ceiling mount according to claim 2, wherein the receiving groove is dimensioned so that it receives the elastomer ring completely or at least to a predominant extent.

5. The ceiling mount according to claim 2, wherein an annular gap formed at a base of the receiving groove between the ceiling tube and the collar of the cover has a horizontally determined average width of less than 5 mm.

6. The ceiling mount according to claim 5, wherein a horizontally determined cross-sectional width of the elastomer ring is greater than an average width of the annular gap.

7. The ceiling mount according to claim 1, wherein the elastomer ring has a constant round cross section.

8. The ceiling mount according to claim 1, wherein the cover is formed thin-walled and shell-shaped.

9. The ceiling mount according to claim 1, wherein an O-ring is provided as an elastomer ring.

10. The ceiling mount according to claim 1, wherein the cover is formed rotationally symmetric.

11. An installation arrangement comprising a ceiling-mounted ceiling mount according to claim 1.

12. The ceiling mount according to claim 1, wherein the ceiling mount is a ceiling-mounted attachment for medical devices.

13. A ceiling mount for a medical device, the ceiling mount comprising:

a support adapted to be secured to a ceiling;

a ceiling tube that is longitudinally extended vertically in a mounting position and held on the support;

a cover mounted in a fixed position relative to the support and to the ceiling tube for the support, the cover having a pass-through opening for the ceiling tube, which is dimensioned slightly larger than an outer dimension of the ceiling tube and is adapted to be placed against the ceiling with a free edge section; and an elastomer ring surrounding the ceiling tube and placed against the cover, wherein the elastomer ring is dimensioned so that it lies against the ceiling tube on an outer lateral surface and is tensioned, and the elastomer ring being positioned on the ceiling tube so that it presses the cover against the ceiling in the mounting position, wherein the pass-through opening of the cover has a collar that is oriented in a direction of the support and is circumferential at least in sections, wherein a receiving groove tapers in the direction of the support and in which the elastomer ring engages is formed by the collar in conjunction with the outer lateral surface of the ceiling tube, and wherein an annular gap formed at a base of the receiving groove between the ceiling tube and the collar of the cover has a horizontally determined average width of less than 5 mm.

14. A ceiling mount for a medical device, the ceiling mount comprising:

a support adapted to be secured to a ceiling;

a ceiling tube that is longitudinally extended vertically in a mounting position and held on the support;

a cover mounted in a fixed position relative to the support and to the ceiling tube for the support, the cover having a pass-through opening for the ceiling tube, which is dimensioned slightly larger than an outer dimension of the ceiling tube and is adapted to be placed against the ceiling with a free edge section; and an elastomer ring surrounding the ceiling tube and placed against the cover, wherein the elastomer ring is dimensioned so that it lies against the ceiling tube on an outer lateral surface and is tensioned, and the elastomer ring being positioned on the ceiling tube so that it presses the cover against the ceiling in the mounting position, wherein the pass-through opening of the cover has a collar that is oriented in a direction of the support and is circumferential at least in sections, wherein a receiving groove tapers in the direction of the support and in which the elastomer ring engages is formed by the collar in conjunction with the outer lateral surface of the ceiling tube, wherein an annular gap formed at a base of the receiving groove between the ceiling tube and the collar of the cover has a horizontally determined average width of less than 5 mm, and wherein a horizontally determined cross-sectional width of the elastomer ring is greater than an average width of the annular gap.

* * * * *